UNITED STATES PATENT OFFICE.

THOMAS W. MITCHELL, OF RICHMOND, TEXAS, ASSIGNOR TO HIMSELF AND ROBERT P. BRISCOE, OF SAME PLACE.

IMPROVEMENT IN COMPOUNDS FOR DESTROYING WORMS IN THE COTTON-PLANT.

Specification forming part of Letters Patent No. 110,774, dated January 3, 1871; reissue No. 5,935, dated June 30, 1874; application filed June 20, 1874.

*To all whom it may concern:*

Be it known that I, THOMAS W. MITCHELL, of Richmond, in the county of Fort Bend and State of Texas, have invented a new and Improved Composition for Destroying Worms on the Cotton-Plant; and I do hereby declare the following to be a full, clear, and exact description of the same.

This invention has for its object the destruction of the cotton-worm, and this object is accomplished by sprinkling the plants on which the worm feeds with a solution of arsenic in water. The arsenic used for this purpose may be either of the opaque or transparent variety. Of the former, the proportion to one pint of water may be ninety-two grains, and of the latter, two hundred and ninety-three grains. While I have named the proportions of water and arsenic which will be found to produce very good results, I do not confine myself to these precise proportions, as a cheaper and, for many purposes, a good article can be made by using a less quantity of arsenic. This solution is applied to the plant by means of an ordinary sprinkler. While it continues in liquid form it adheres to the surfaces of the leaves and stems, and is, consequently, partaken of by the worms, and causes their death. By the time it becomes dry all the worms on the plant at the time of sprinkling are destroyed. The arsenic evaporates as the solution dries, and passes off into the air, or is blown away, leaving no remnant of poisonous matter upon the plants. While, therefore, the arsenic solution is destructive to worm life, it does not render the plant dangerous to human beings. Of course this worm-destroyer may be applied to other plants as well as cotton.

What I claim, and desire to secure by Letters Patent, is—

The improved solution herein described, prepared in the manner and in substantially the proportions herein set forth, so as to be used as specified.

In testimony that I claim the above I have hereunto subscribed my name in the presence of two witnesses.

TOM. W. MITCHELL.

Attest:

T. L. T. KINDALL,

A. HARWOOD.